(12) United States Patent
Maurer et al.

(10) Patent No.: US 6,700,953 B1
(45) Date of Patent: Mar. 2, 2004

(54) SYSTEM, APPARATUS, METHOD AND ARTICLE OF MANUFACTURE FOR EVALUATING THE QUALITY OF A TRANSMISSION CHANNEL USING VOICE RECOGNITION TECHNOLOGY

(75) Inventors: Brett Pierre Maurer, Alexandria, VA (US); Michael Jacob Schechter, Peekskill, NY (US); Curtis Fred Elsasser, Brooklyn, NY (US)

(73) Assignee: Metatron Technologies, Inc., New York, NY (US)

( * ) Notice: Subject to any disclaimer, the term of this patent is extended or adjusted under 35 U.S.C. 154(b) by 106 days.

(21) Appl. No.: 09/655,621

(22) Filed: Sep. 2, 2000

(51) Int. Cl.[7] .................................................. H04M 1/64
(52) U.S. Cl. .............................. 379/88.01; 379/88.02; 370/249; 455/423; 704/233

(58) Field of Search ........................ 379/88.01, 88.02, 379/406.02, 167.14, 351, 388.04, 388.05, 15.02, 15.03, 16, 23, 26.01, 27.02, 27.03, 27.04, 1.04, 10.02, 15.01; 370/249; 704/233

(56) References Cited

U.S. PATENT DOCUMENTS

| 5,835,565 A | * | 11/1998 | Smith et al. .................... 379/22 |
| 5,987,320 A | * | 11/1999 | Bobick ......................... 370/241 |
| 6,275,797 B1 | * | 8/2001 | Randic ......................... 704/231 |
| 6,304,634 B1 | * | 10/2001 | Hollier et al. ............. 379/1.02 |

* cited by examiner

*Primary Examiner*—Fan Tsang
*Assistant Examiner*—Gerald Gauthier
(74) *Attorney, Agent, or Firm*—Foley & Lardner

(57) ABSTRACT

The present invention measures the quality of a transmission channel by utilizing voice recognition technology in a novel manner.

12 Claims, 5 Drawing Sheets

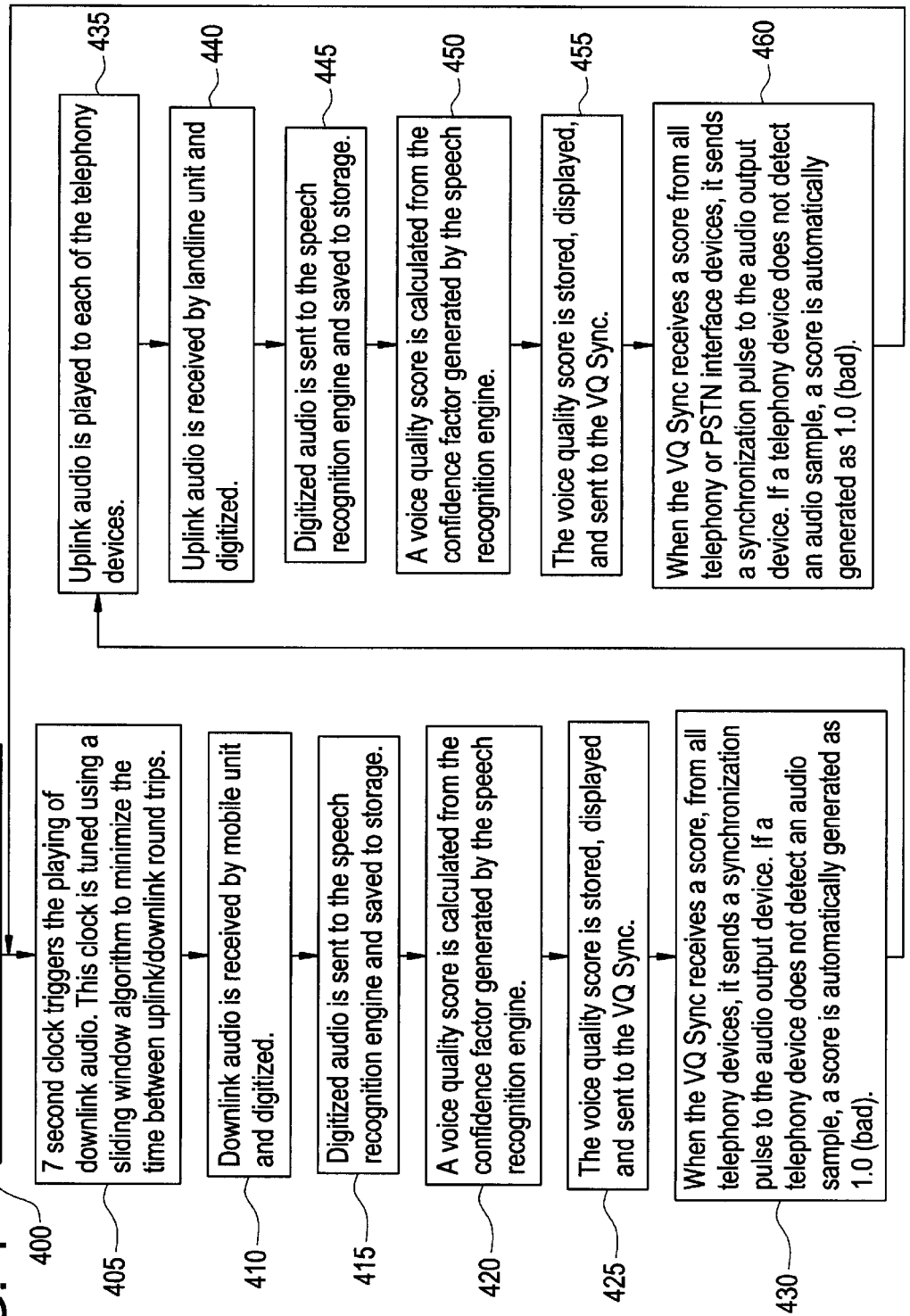

SYSTEM, APPARATUS, METHOD AND ARTICLE OF MANUFACTURE FOR EVALUATING THE QUALITY OF A TRANSMISSION CHANNEL USING VOICE RECOGNITION TECHNOLOGY

CROSS-REFERENCE TO RELATED APPLICATIONS

"Not Applicable"

STATEMENT REGARDING FEDERALLY SPONSORED RESEARCH OR DEVELOPMENT

"Not Applicable"

REFERENCE OF A "MICROFICHE APPENDIX"

"Not Applicable"

BACKGROUND

1. Field of Invention

The present invention relates to systems analysis and more particularly, to a system, apparatus, method and article of manufacture for evaluating the quality of a transmission channel using voice recognition technology. Among other features to be described in more detail later, the system, apparatus, method and article of manufacture is particularly suited for providing an objective measurement, in real-time, of the quality of audio signals transmitted along the transmission channel.

2. Description of the Related Art

Many technologies are used in today's telecommunication systems, so powerful test tools are essential for designing, building and optimizing such systems. Engineers require tools that measure technology-specific information as well as overall quality of service. In industries such as wireless telecommunication and Voice Over IP (VoIP), intense competition has driven companies to provide better and better quality at lower end-user cost. Test tools are needed that can objectively measure the quality of service (QoS) for differing telecommunication technologies while providing a common benchmark criteria for all.

The best way of measuring telecommunication QoS is to measure the actual quality of transmitted voice. Voice quality measurement can be subjectively measured using a panel of people but this can result in inconsistent results that are not repeatable. This method can also be expensive when used for subsequent trials, such as when engineers may take the results of the panel test, modify the network for better performance, and need to repeat the testing cycle. Engineers need a way of objectively measuring voice quality that is accurate, repeatable, economical, and consistent across different telecommunication technologies.

Telecommunication is international. Since many telecommunication vocoders are often designed to the operate for a particular language or voice type, QoS might digress if used by an international user base. Voice quality measurement tools must be the operational for different languages and voice types.

The first solutions for measuring voice quality were techniques of mean opinion score (MOS). Panels of people were used in a controlled environment to give an opinion of samples of voice quality. The scores from each person were then averaged to give a resulting MOS score. This solution was not repeatable, costly, and not practical for engineers designing telecommunication systems. It also required time to gather the panel of people, administer the tests, and formulate the resultant scores.

Early analog telecommunication systems would send audio tones across an audio channel to measure the received signal, noise and distortion (SINAD). Although this method was objective and repeatable, it became obsolete with the advent of digital communications technologies. Digital communications implement vocoders that digitally represent voice according to a set of voice characteristics. Since SINAD uses audio tones as the source, vocoders distort the signal and produce erroneous results.

Modern voice quality measurement solutions use the Perceptual Voice Quality Measure (PSQM) algorithm defined in ITU Recommendation P.861. Although the PSQM algorithm is accurate for many telecommunication technologies, it has some shortcomings that make it difficult to implement. Tools that use the PSQM algorithm must be calibrated using MOS testing. Since MOS testing is timely and expensive, it is difficult for test tool manufacturers using PSQM to quickly react to market needs. Furthermore, PSQM is difficult to implement in VoIP systems because large amounts of latency disrupt the synchronization of the received signal to the undistorted reference signal.

SUMMARY OF THE INVENTION

The present invention, sometimes referred to as Opera™, uniquely adapts voice recognition technology for the purpose of measuring the voice quality of telecommunication systems. With the rapid development of telecommunication technology, engineers require powerful test tools that can measure the performance of their system and compare that performance to other competing systems. The present invention provides an accurate practical tool that measures voice quality in real-time and records audio for later examination. Because objective voice quality scores are universal measurements that apply to all telecommunication systems, The present invention can be used for a wide variety of testing applications.

The present invention measures the voice quality of telecommunication systems in a way that is accurate, repeatable, and practical for real-time implementation. The present invention resolves the shortcomings of previous methods while providing the flexibility for different languages and different technologies. The present invention can also be used on high latency technologies such as those implemented with VoIP.

The key to the present invention's flexibility involves a unique application of voice recognition technology for the purpose of measuring voice quality. Voice recognition combined with high quality audio equipment and some custom software development creates a powerful and effective solution.

Therefore, in accordance with one aspect of the present invention there is provided a method for evaluating the quality of a transmission channel having a first port and a second port, comprising the steps of: transmitting a first signal from said first port to said second port via said transmission channel; receiving said first signal at said second port; analyzing said first signal using voice recognition technology to generate a quality score within a predetermined time frame; monitoring step (c) to ensure that said quality score is generated during said predetermined time frame; assigning a default quality score if a quality score is not generated during said predetermined time frame; transmitting a second signal from said second port to said first port, via said transmission channel, after said quality score is either generated or assigned said default quality score; and monitoring step (f) to ensure that said second signal is not being transmitted to said first port while said first signal is being processed.

In accordance with a second aspect of the present invention, there is provided a method further comprising the step of storing, in a storage medium, the first signal and the quality score.

In accordance with a third aspect of the present invention, there is provided a method further comprising the step of displaying said quality score.

In accordance with a third aspect of the present invention, there is provided a method wherein said quality score is displayed in real-time.

These aspects and other aspects, features and advantages of the present invention will become better understood with regard to the following description, accompanying drawings and appended claims.

BRIEF DESCRIPTION OF THE DRAWINGS

Exemplary embodiments of the present invention are now briefly described with reference to the following drawings:

FIG. 4 is flow diagram of primary operational steps performed by one embodiment of a system constructed in accordance with present invention.

DETAILED DESCRIPTION OF THE INVENTION

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims. The leading digit(s) of the reference numbers in the Figures usually correspond to the figure number, with the exception that identical components which appear in multiple figures are identified by the same reference numbers.

1. Overview

The present invention is specifically designed to measure the voice quality of a communication device's audio channel. It measures both the uplink audio (mobile to landline) and downlink audio (landline to mobile). To completely isolate the testing of uplink and downlink audio, audio samples are alternated and analyzed in a half duplex fashion.

The present invention can easily adapt to different communication standards and applications by modifying the audio interface coupled to the communication device. For illustrative purposes, however, what follows describes one application of the present invention to wireless technology.

Figure 1:
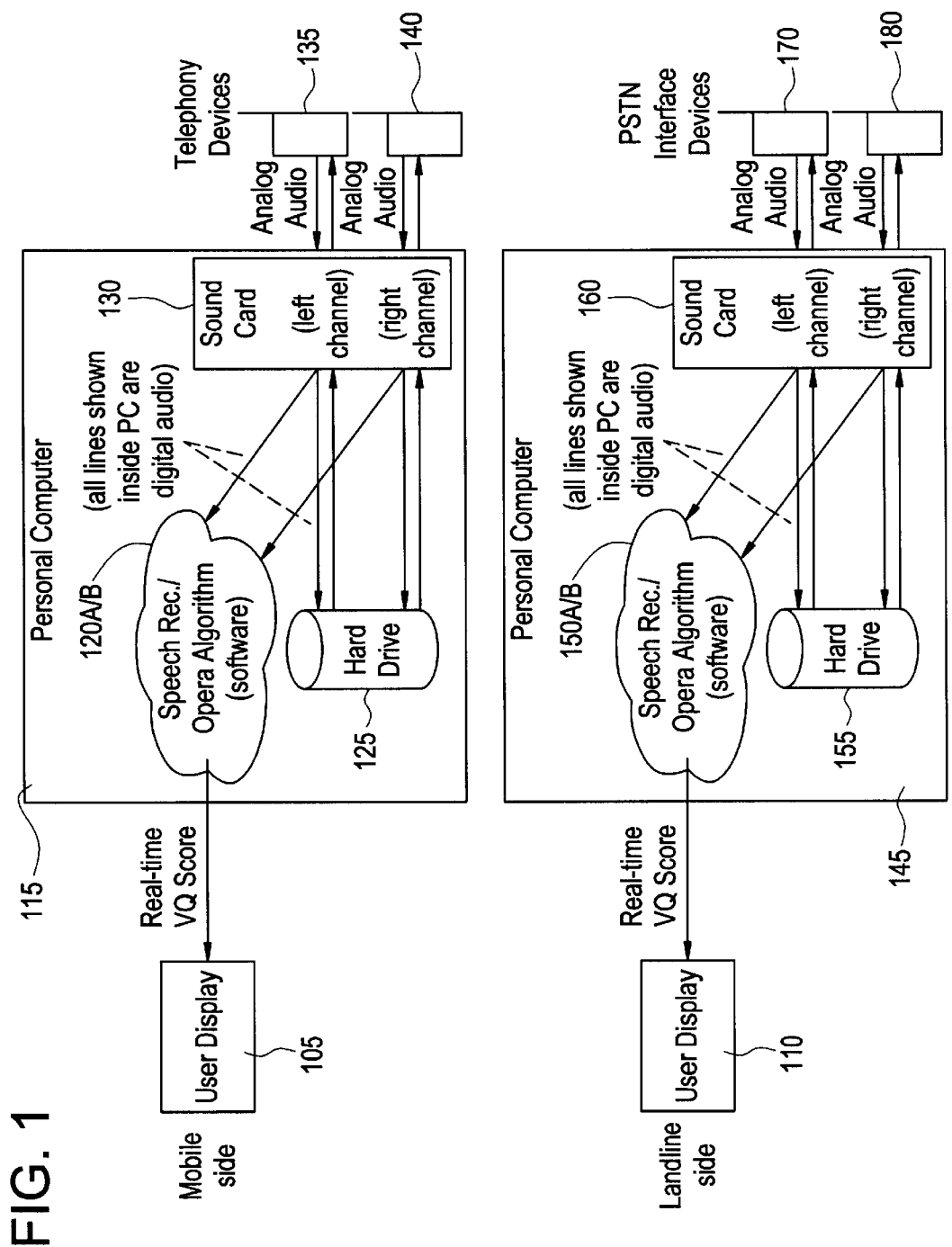
FIG. 1 is a physical diagram representing a system constructed in accordance with the present invention.
Figure 2:
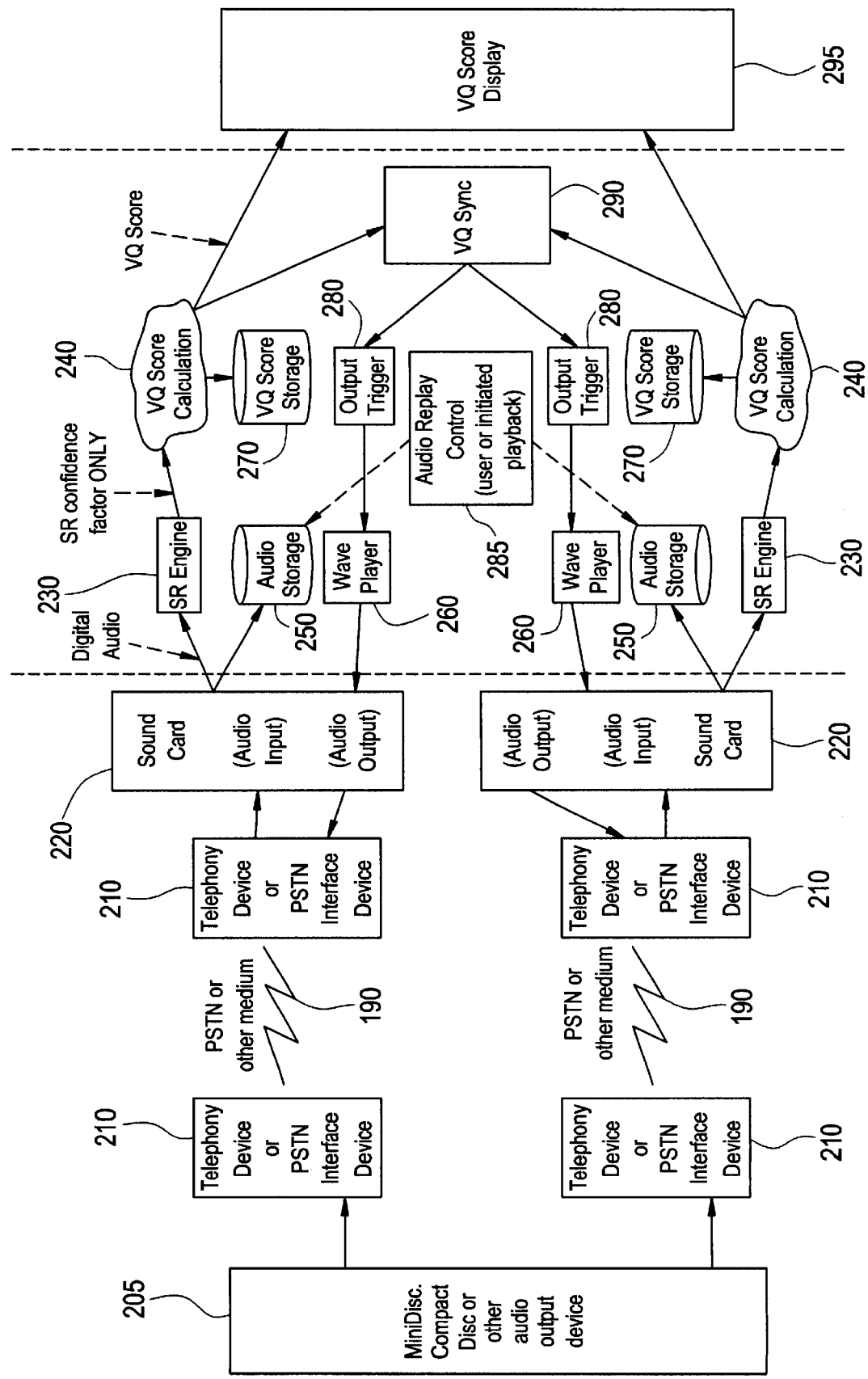
FIG. 2 is a functional diagram of one embodiment of a system constructed in accordance with the present invention.
Figure 3A:
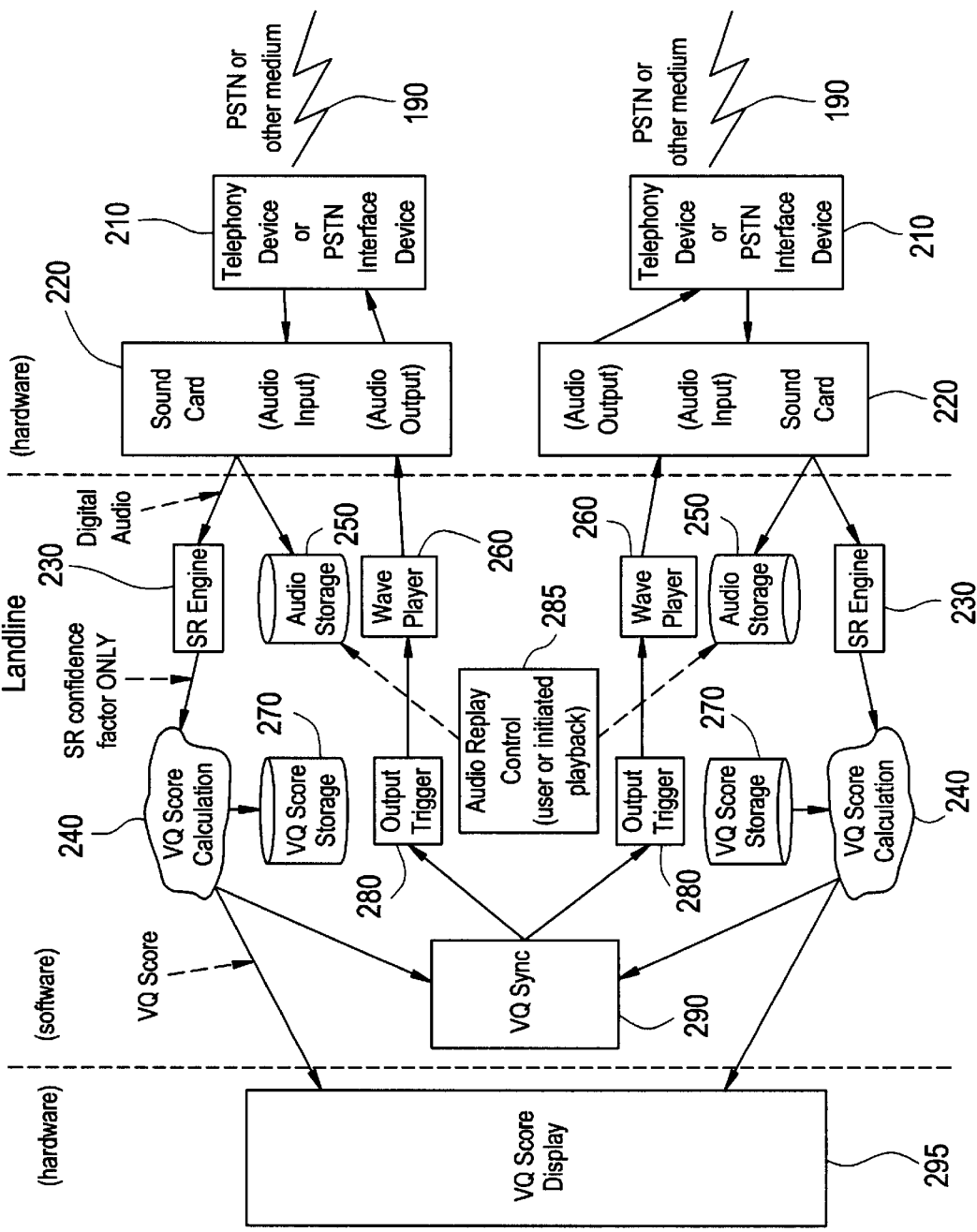
FIGS. 3A and 3B show a functional diagram of an alternative embodiment of a system constructed in accordance with the present invention (FIGS. 3A and 3B constitute one figure, with FIG. 3A being the left side and FIG. 3B being the right side; the entire figure hereinafter referred to as FIG. 3).
Figure 3B:
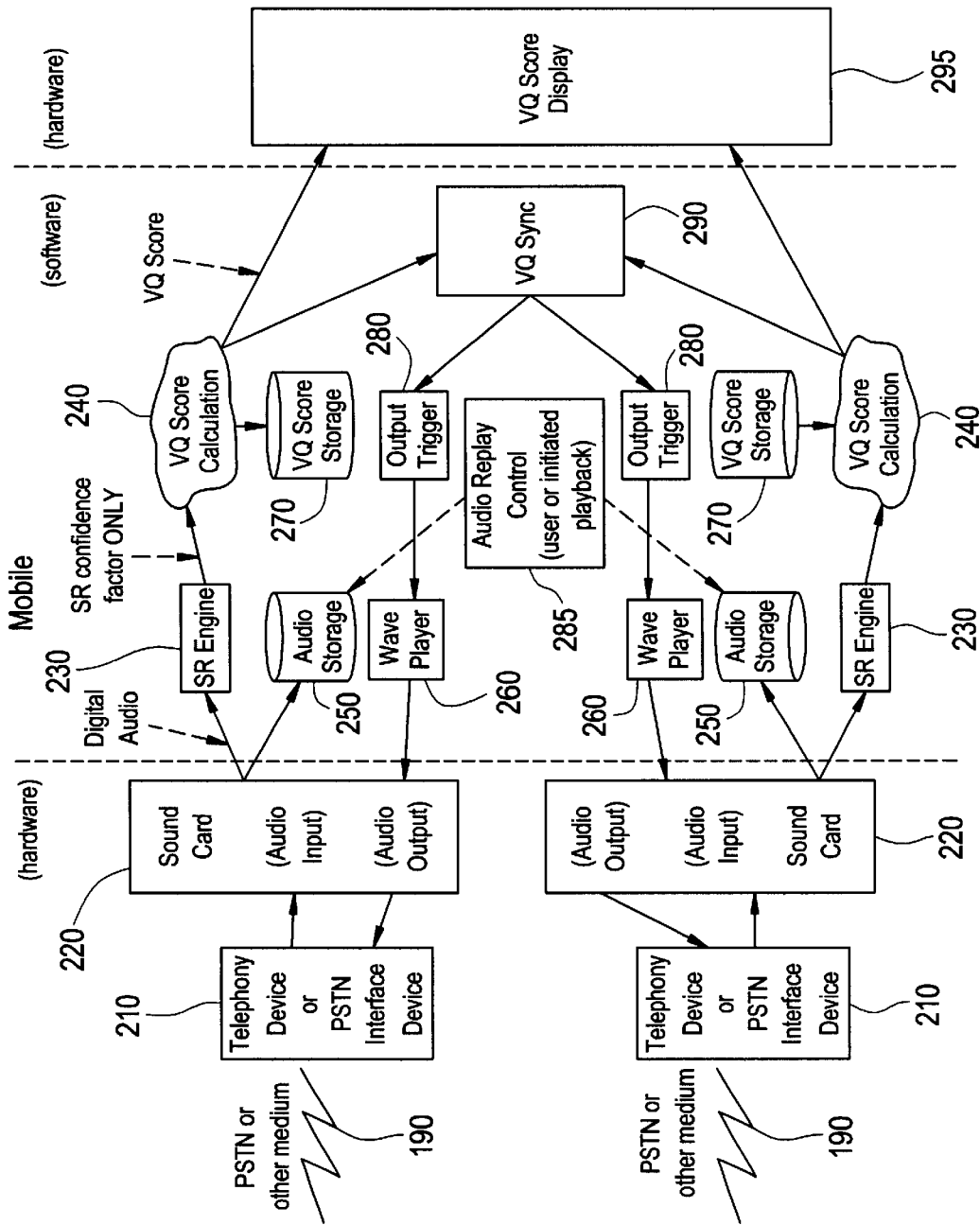

2. Configuration of a System Constructed in Accordance with the Present Invention FIG. 1 is a physical diagram representing a system constructed in accordance with the present invention that provides for a means of analysis at both a mobile and a landline side. FIGS. 2 and 3 are functional diagrams of alternative embodiments of a system constructed in accordance with the present invention that provides for a means of analysis at both a mobile and a landline side. Together these Figures describe the novel and inventive aspects of the present invention.

Generally speaking, the system comprises one or more data processing systems running one or more software applications. The data processing systems are electronically coupled to one or more communication devices via a communications medium.

A. Hardware Components

At the mobile side, communication devices 135 and 140 are devices that interface with a communications medium to transmit and/or receive audio signals. As shown, an example of such a device is a wireless telephone. The analog audio signal that is produced by the communication device is usually line level audio but might vary depending on the type of communication device.

At the landline side, communication devices 170 and 180 are typically devices that interface with a communications medium to transmit and/or receive audio signals. As shown, an example of such a device is a Public Switched Telephone Network (PSTN) interface device, which interfaces with a PSTN. The interface device automatically answers incoming calls. Each interface device is designed for the appropriate communication medium it interfaces with (i.e.: some applications of VoIP, radio-to-radio telecommunication, etc.)

Situated at both the mobile and landline side, are data processing systems 115, 145. Date processing systems 115, 145 are typically standard computers designed according to widely understood principles. As illustrated, the computers each comprise a processor, memory 125, 155 associated with the processor, e.g., storage media, and selected peripherals, namely input and output devices, such as, a sound card 130, 160 and a display device 105, 110, also associated with the processor.

The sound card 130, 160 is a device having a stereo channel that is used to convert analog audio signals to digital audio signals and/or vice-versa. The audio device sampling rate used in our current system is 11.025 kHz, and is monaural. This can be, but is not limited to, an internal card, PCMCIA card, USB sound device, etc. In the present invention, the mono channel communication devices or PSTN interfaces are each connected to a stereo channel via a physical adapter. The present invention splits the incoming stereo channel into two mono channels and passes that to the voice recognition module or application. This allows two communication devices to be used on one stereo sound card jack. FIG. 1 shows the stereo sound card interfacing with two communication devices. However, there can be 1 . . . N communication devices (where N is a positive value), limited only by the number of sound cards (as shown in the present system there are two communication devices per sound card) and the processor's capability.

Communications medium 190 (see FIG. 2) can be a choice of a PSTN, a wireless network, a satellite communications network, or some other communications network.

B. Software Components

Associated with the processor of the computer 115 and 145 and executable by the processor are several programming modules or software objects, namely a voice recognition application 120A and a quality measurement application 120B. Both the voice recognition application 120A and the quality measurement application 120B cooperate with each other and are central to the operation of the present invention.

Voice recognition application 120A is a voice recognition software module or engine (e.g., see SR engine 230 in FIG. 3) that produces a preliminary score or confidence factor corresponding to voice quality. A single, phonetically balanced word phrase (audio bite) is set up as the grammar (i.e.: "Jump the fence and hurry up the bank"). The voice recognition engine's confidence factor is based on how closely the incoming digitized audio matches the known phrase. Laboratory testing has found that some, but not all voice recognition engines allow one phrase in a grammar to affect other distinct phrases in the same grammar. A single grammar phrase is suggested in order to minimize this effect.

Quality measurement application 120B is a programming module, that in cooperation with the voice recognition module 120A is the heart of the present invention. As shown in FIGS. 2 and 3, Quality measurement application 120B comprises several cooperating functions and data files namely, Audio Storage 250, VQ Score Calculation 240, VQ Score Storage 270, VQ Score Display 295, VQ Score Sync 290, Output Trigger 280, Wave Player 260, and Audio Replay Control 285.

Audio Storage 250 is a programming module that stores the digital audio for later review.

VQ Score Calculation 240 is a programming module that converts the score or confidence factor (SRConfidencefactor) generated by the voice recognition engine to an objective voice quality score (VQScore) between 1 (bad) and 5 (excellent) using the following mathematical equation:

$$VQScore = (SRConfidencefactor) * dM - dB$$

where dM and dB are calibration factors.

The equation is defined during laboratory calibration. Each unique sample sentence transmitted by a transmitting communication device and received by a corresponding receiving communication device has a different calibration. Once the linear calibration factors (dM for slope and dB for y-intercept) are determined, the programming module calculates the voice quality score using the above equation.

VQ Score Storage 270 is a programming module that stores the voice quality scores for later review.

VQ Score Display 295 is a programming module that displays the voice quality scores to the user in real-time via a display device. The word "display device" is used generically here and can encompass a variety of solid state devices or means such as, a CRT display, a LCD display, a printed report, a voice notification means and/or any other like device or mechanism.

VQ Score Sync 290 is a programming module that monitors all communication devices and outputs a synchronization pulse when incoming audio has been scored. This programming module ensures that outgoing audio is not sent when incoming audio is being processed. It also detects if any or all of the communication devices have not received audio in a given time (missing pulse detection based upon a sliding time window).

Output Trigger 280 is a programming module that starts output wave audio when triggered by the VQ Score Sync programming module 290.

Wave Player 260 is a programming module that plays outgoing audio samples.

Audio Replay Control 285 is a programming module that allows a user to replay stored digital audio as it corresponds to any voice quality score.

FIG. 2 is a functional diagram of one embodiment of a system constructed in accordance with the present invention. Here, the system is constructed to provide half duplex voice quality measurement of an audio channel. At the landline side a compact disc, a mini disc or other audio output device 205 provides audio signals to a communication device or an interface device 210. The communication device or an interface device 210 transmits the audio signals via an audio channel 190 where it is received by a communication device or an interface device 210 at the mobile side for processing at the mobile side in accordance with the principles of the present invention.

FIG. 3 is a functional diagram of an alternative embodiment of a system constructed in accordance with the present invention. Here, the system is constructed to provide full duplex voice quality measurement of an audio channel. At both the landline side and the mobile side audio signals are processed in accordance with the principles of the present invention.

3. Method of Using a System Constructed in Accordance with the Present Invention FIG. 4 is flow diagram of the primary operational steps of one embodiment of a system constructed in accordance with present invention.

A. Downlink Process

At 400, a user, using a computer located at the landline side, accesses the system. At 405, a seven (7) second clock is triggered and downlink analog audio begins to play (landline to mobile). The clock is tuned using any widely known sliding window algorithm to minimize the time between uplink/downlink round trips. At 410, the downlink analog audio is received by a mobile unit where it is digitized. At 415, the now digitized audio is sent to the voice recognition engine module where a confidence factor is generated by the voice recognition engine optionally, the digitized audio can be stored in a data file for later retrieval and processing. At 420, a voice quality score is calculated based upon the confidence factor generated during the previous step. At 425, the voice quality score is sent to the VQ Sync module. Preferably, the score is displayed on a display device in real-time and/or stored in a data file for later retrieval and processing. At 430, when the VQ Sync module receives a score from all communication devices—i.e. telephony or network interface devices, it sends a synchronization pulse to the audio output device. If a communication device does not detect an audio sample, a default value of 1 or "bad" is scored.

B. Uplink Process

At 435, uplink audio is played to each communication device connected to the system. At 440, the uplink audio is received by the landline unit and digitized. At 445, the digitized audio is sent to the voice recognition engine and saved to storage. At 450, a voice quality score is calculated based upon the confidence factor generated during the previous step. At 455, the voice quality score is sent to the VQ Sync module 290. Preferably, the score is displayed on a display device 295, in real-time, and/or stored in a data file for later retrieval and processing. At step 460, when the VQ Sync module 290 receives a score from all communication devices—i.e. telephony or network interface devices, it sends a synchronization pulse to the audio output device. If a communication device does not detect an audio sample, a default value of 1 of "bad" is scored.

4. Operation Steps in More Detail

Referring to FIGS. 2 and 3, the two parts of the present invention, the mobile unit and the landline unit, are shown. Both units are essentially the same and can be adapted for other types of telecommunication applications, such as, VoIP. In a general sense, the mobile unit and landline unit work together like two people having a conversation. First, the landline unit transmits a short voice sentence that the mobile unit measures for phonetic accuracy and scores according to a scale similar to MOS. Next, the mobile unit transmits a short voice sentence and the landline unit measures the quality. This conversation continues as long as the call is up.

At both the mobile unit and landline unit, an audio device in a personal computer is used to convert analog signals to digital signals or digital signals to analog signals. The parameters of audio conversion are as follows:

Sample type=16 bit mono PCM

Sample rate=11.025 kHz

This sample type is consistent with the audio bandwidth of most telecommunication systems. To accurately capture analog audio in digital format, it is generally accepted to take a 2–3 times sampling rate of the audio bandwidth. Most telecommunication systems have an audio channel of about 3 kHz. 11.025 kHz is 3.675 times 3 kHz. 11.025 kHz is also the sample type used by most voice recognition engines.

Most telephony/communication devices have an audio interface that can be connected to external devices. This interface usually uses line level or microphone level signals. The audio devices in the mobile unit and landline unit are line level. Some system configurations require audio adapters to interface the audio devices to the telephony/communication devices. Because most professional audio equipment has far better quality than telephony/communication technology, distortion caused by such equipment is negligible. Most of the distortion measured by the present invention comes from the telephony/communication audio channel. This is precisely the distortion engineers would like to measure. Received audio that has been digitized by the audio device is sent to the voice recognition engine and also saved as an audio file, such as a standard Microsoft wave format audio files.

In a preferred embodiment the stereo card supports two telephony/communications devices. Each device is a monaural device connected to either the left or right channel of the stereo sound card jack via an adapter. The present invention splits the stereo audio data into two mono channels during recording from the telephony/communication device, or merges two mono audio channels to a stereo channel for playback to the telephony/communication device.

In one embodiment of the present invention, the voice recognition module is L&H ASR 1600® voice recognition engine. Other voice recognition engines, such as the Microsoft SR Engine® and IBM Via-Voice® can also be used. Whatever the specific engine chosen, to get the voice recognition engine to properly measure voice quality, it must be properly setup and configured as follows:

1) A grammar must be defined to contain only one user phrase (or "word" as the voice recognition software refers to it, even though it can be multiple spoken words such as "Jump the fence and hurry up the bank").

2) The user phrase must be trained using the audio sample used for voice quality measurement.

3) The audio sample used to train the user phrase should be 2.5 seconds and must be professionally recorded with minimal background noise and clear voice. We suggest a phonetically balanced phrase.

4) The language supported by the voice recognition engine must be consistent with the language of the audio sample.

5) The parameters of the voice recognition engine must be set to include all erroneous noise and distortion in the calculation of the confidence factor. Most voice recognition engines produce a confidence factor score that represents the engine's confidence in a sentence it has detected.

6) The engine must be set to continually monitor received audio.

When the voice engine detects the audio sample, it reports the confidence factor to the voice quality score calculation object. The voice quality score is calculated using parameters that were calibrated through laboratory experimentation. Calibration is performed by sending known audio samples into the voice engine and examining the confidence score reported. After many sentences are sent to the voice engine, a mathematical equation can be created to translate confidence factors into voice quality scores. This mathematical equation is then always used with its corresponding audio sample.

A software component called the VQ Sync 290 is used to trigger the playing of output audio only after the audio sample from all telephone devices has been measured. The VQ Sync 290 has a sliding time window in which it expects to receive all the voice quality scores. When all scores have been received, it triggers the playing of output audio. If a score is not received for a device within the expected time window, the trigger will be sent and a score of 1.0 will be recorded for the audio sample. Output audio is played using the same audio device configuration as the received audio.

Each of the voice quality scores is tagged with a time/date stamp. In our current system, we use a resolution of 1 millisecond. This can be used to correlate with data from a global positioning system (GPS) to plot the voice quality scores on a map, thus allowing an engineer to see where the voice quality degrades, to plot coverage maps, etc.

After a test session is completed, the recorded audio can be replayed using the Audio Replay Control module. This module makes it easy for engineers to examine the actual audio samples measured by the present invention. There are many types of audio distortion and the voice quality score alone cannot represent this distortion fully. By listening to the audio, engineers can better understand the cause of poor audio quality.

In our trials, we have found that the present invention provides a voice quality test solution that is highly adaptable and practical. For instance, it can be used for a wide variety of telephony/communication technologies while providing accurate, economical, repeatable measurements of voice quality. We have tested with at least six different brands of wireless phones, four different telephone network operator systems (i.e.: phone networks), numerous corded and cordless phones, and even audio recording and playback devices, such as compact discs players and mini disc players. None of these device or network changes required major modifications to the present invention. The only required modification would be the interface to the new audio device.

The present invention's real-time performance, versatility and ability to record audio makes it a great. tool for engineers working on telephony/communication systems since feedback time is minimized in a test/get results/tune telephony—communication device or network/test cycle.

Furthermore, the present invention's ability to compare and contrast the performance of multiple technologies at once in a time-synced fashion provides engineers with the tools they need to benchmark their systems against competing systems.

5. Advantages and Closing

The present invention is fundamentally different from existing solutions. First, the present invention can use readily available and affordable off-the-shelf professional audio devices to convert analog/digital audio. Other solutions use specialized and expensive Digital Signal Processing equipment to convert analog/digital audio. Second, the present invention does not use audio synchronization signals to mark the beginning of an audio sample. Other solutions use audio synchronization signals that become problematic with low rate vocoders or VoIP technologies. Third, the present invention records and stores audio for later examination. Other solutions do not record audio. Fourth, the present invention instantly adapts to new communication devices. Other solutions must be individually calibrated for every communication device used. Fifth, the present invention supports multiple languages as defined by the particular voice recognition engine capabilities. Other solutions only work with English. Sixth, the present invention synchronizes the measurement of multiple communication devices operating simultaneously. Other solutions do not synchronize multiple devices thus any derived measurements tend to be several seconds out of sync.

The present invention has numerous advantages over existing solutions, chief of which include the following: 1) accurate measurements of voice quality for many types of distortion. Test methods are immediately repeatable and consistent. There is no need to have a panel listen to audio recordings each time a test is necessary. In addition, if there are different people in the panel each time, the results are inconsistent; 2) calibration is no longer required for every communication device used. If the communication device has a way to output audio, it can be hooked to the system. There is no need to modify the present invention for differing codecs or hardware, unlike existing systems; 3) engineers can evaluate new communication devices and technologies (such as W-CDMA or even prototype phones) the instant they are available. All existing voice quality measurement solutions require huge lead-times for integration of the new communication device or technology; 4) real-time voice quality measurement. For example if the present invention is used to test a phone network for eight hours, eight hours worth of voice quality scores are generated at the end of the testing cycle. With certain existing solutions, at a minimum, another eight hours is required to have people listen to the recordings and render their voice quality scores; 5) engineers can add audio quality measurement to traditional field measurement tools allowing them to see how factors such as poor signal strength affect audio quality; 6) engineers can compare the performance of their system to competitors' systems to see where more optimization is required; using the present invention gives engineers the perspective they need by showing them how consumers judge audio quality and network performance; and 7) the present invention allows two communication devices per each stereo sound card jack, doubling the number of communication devices that can be measured simultaneously.

Having now described one or more preferred embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. A method for evaluating the quality of a transmission channel having a first port and a second port, comprising the steps of:

(a) transmitting a first signal from said first port to said second port via said transmission channel, said first signal being an analog signal;

(b) receiving said first signal at said second port, and converting said first signal to a digital signal;

(c) analyzing said digital signal using voice recognition technology to generate a quality score within a predetermined time frame;

(d) monitoring step (c) to ensure that said quality score is generated during said predetermined time frame;

(e) assigning a default quality score if a quality score is not generated during said predetermined time frame;

(f) transmitting a second signal from said second port to said first port, via said transmission channel, after said quality score is either generated or assigned said default quality score;

(g) monitoring step (f) to ensure that said second signal is not being transmitted to said first port while said digital signal is being processed; and (h) applying a time stamp to said digital signal that is obtained from said first signal, said time stamp being indicative of when said first signal was received in step (b), wherein a quality contour map is generated based in part on: i) the respective time stamps for a plurality of said first signals received over a period of time, and ii) the respective quality scores generated in step (c), when step (b) is performed at a plurality of different locations at a plurality of different times within a region.

2. A method for evaluating the quality of a transmission channel having a first port and a second port, comprising the steps of:

(a) transmitting a first signal from said first port to said second port via said transmission channel, said first signal being an analog signal;

(b) receiving said first signal at said second port, and converting said first signal to a digital signal;

(c) analyzing said digital signal using voice recognition technology to generate a quality score within a predetermined time frame;

(d) monitoring step (c) to ensure that said quality score is generated during said predetermined time frame;

(e) assigning a default quality score if a quality score is not generated during said predetermined time frame;

(f) transmitting a second signal from said second port to said first port, via said transmission channel, after said quality score is either generated or assigned said default quality score; and (g) monitoring step (f) to ensure that said second signal is not being transmitted to said first port while said digital signal is being processed, wherein the quality score is calculated based on the equation:

$$VQScore = SRConfidenceFactor * dM - dB,$$

wherein:
VQScore is the quality score,
SRConfidenceFactor is a confidence factor computed by a voice recognition software module that performs an initial voice recognition processing on said digital signal,
dM is a multiplicative calibration factor, and
dB is an additive calibration factor.

3. An apparatus for evaluating the quality of a transmission channel, said apparatus having an interface to said transmission channel, said apparatus comprising:

(a) a processor configured to transmit a second signal via said transmission channel and to receive and process a first signal via said transmission channel, said first signal corresponding to a digitized version of an analog signal that was sent from another apparatus to said apparatus over said transmission channel, said processor performing a digital-to-analog conversion of said first signal to obtain said first signal;

(b) a voice recognition module associated with said processor for analyzing, using voice recognition technology, said first signal to generate a preliminary score;

(c) a quality score module associated with said processor for generating a quality score based on said preliminary score during a predetermined time frame;

(d) a monitoring module associated with said processor for ensuring that said quality score is generated during a predetermined time frame and for assigning a default quality score if a quality score is not generated during said predetermined time frame;

(e) a synchronization module associated with said processor for transmitting said second signal via said transmission channel after generating said quality score or assigning said default quality score and after said first signal is processed; and (f) a time stamp applying unit configured to apply a time stamp to said first signal, said time stamp being indicative of when said first signal was received by said apparatus, wherein a quality contour map is generated based in part on: i) the respective time stamps for a plurality of said first signals received over a period of time, and ii) the respective quality scores generated for said plurality of first signals, and wherein said plurality of first signals are received at a plurality of different locations at a plurality of different times within a region.

4. An apparatus for evaluating the quality of a transmission channel, said apparatus having an interface to said transmission channel, said apparatus comprising:

(a) a processor configured to transmit a second signal via said transmission channel and to receive and process a first signal via said transmission channel, said first signal corresponding to a digitized version of an analog signal that was sent from another apparatus to said apparatus over said transmission channel, said processor performing a digital-to-analog conversion of said first signal to obtain said first signal;

(b) a voice recognition module associated with said processor for analyzing, using voice recognition technology, said first signal to generate a preliminary score;

(c) a quality score module associated with said processor for generating a quality score based on said preliminary score during a predetermined time frame;

(d) a monitoring module associated with said processor for ensuring that said quality score is generated during a predetermined time frame and for assigning a default quality score if a quality score is not generated during said predetermined time frame; and (e) a synchronization module associated with said processor for transmitting said second signal via said transmission channel after generating said quality score or assigning said default quality score and after said first signal is processed, wherein the quality score is calculated by said quality score module based on the equation:

$$VQScore = SRConfidenceFactor * dM - dB,$$

wherein:
VQScore is the quality score,
SRConfidenceFactor is the preliminary score computed by said voice recognition module,
dM is a multiplicative calibration factor, and
dB is an additive calibration factor.

5. A system for evaluating the quality of a transmission channel, comprising:

(a) a first processor;

(b) a second processor;

(c) a transmission channel therebetween; said first processor and second processor configured to interface with said transmission channel and to transmit a second signal to the other and receive a first signal from the other via said transmission channel, said first and second signals being sent as analog signals over said transmission channel;

(d) a first programming module associated with said first processor for: 1) analyzing, using voice recognition technology, a digital representation of said first signal to generate a preliminary score; 2) generating a quality score based on said preliminary score during a predetermined time frame or assigning a default quality score if a quality score is not generated during said predetermined time frame; and 3) transmitting said second signal via said transmission channel after either generating said quality score or assigning said default score and after said digital representation of said first signal is processed; and (e) a second programming module associated with said second processor for: 1) analyzing, using voice recognition technology, a digital representation of said first signal to generate a preliminary score; 2) generating a quality score based on said preliminary score during a predetermined time frame or assigning a default quality score if a quality score is not generated during said predetermined time frame; and 3) transmitting said second signal via said transmission channel after either generating said quality score or assigning said default score and after said digital representation of said first signal is processed, wherein each of said first and second programming modules comprises:
a time stamp applying unit configured to apply a time stamp to said first signal, said time stamp being indicative of when said first signal was received by said apparatus, wherein a quality contour map is generated based in part on: i) the respective time stamps for a plurality of said first signals received over a period of time, and ii) the respective quality scores generated for said plurality of first signals, and wherein said plurality of first signals are received at a plurality of different locations at a plurality of different times within a region.

6. A system for evaluating the quality of a transmission channel, comprising:

(a) a first processor;

(b) a second processor;

(c) a transmission channel therebetween; said first processor and second processor configured to interface with said transmission channel and to transmit a second signal to the other and receive a first signal from the other via said transmission channel, said first and second signals being sent as analog signals over said transmission channel;

(d) a first programming module associated with said first processor for: 1) analyzing, using voice recognition technology, a digital representation of said first signal to generate a preliminary score; 2) generating a quality score based on said preliminary score during a predetermined time frame or assigning a default quality score if a quality score is not generated during said predetermined time frame; and 3) transmitting said second signal via said transmission channel after either generating said quality score or assigning said default score and after said digital representation of said first signal is processed; and (e) a second programming module associated with said second processor for: 1) analyzing, using voice recognition technology, a digital representation of said first signal to generate a preliminary score; 2) generating a quality score based on said preliminary score during a predetermined time frame or assigning a default quality score if a quality score is not generated during said predetermined time frame; and 3) transmitting said second signal via said transmission channel after either generating said quality score or assigning said default score and after said digital representation of said first signal is processed, wherein the quality score is calculated based on the equation:

$VQScore = SRConfidenceFactor * dM - dB,$ wherein:

VQScore is the quality score,

SRConfidenceFactor is the preliminary score generated by the voice recognition technology, dM is a multiplicative calibration factor, and dB is an additive calibration factor.

7. A system for evaluating more than one transmission channel simultaneously, comprising:

(a) a first processor;

(b) a second processor;

(c) a plurality of transmission channels therebetween; said first processor and second processor configured to interface with each of said plurality of transmission channels and to send a second signal to the other and receive a first signal from the other via each of said plurality of transmission channels, said first and second signals being sent as analog signals over said plurality of transmission channels;

(d) a first programming module associated with said first processor for: 1) analyzing, using voice recognition technology, a respective digital representation of each of said first signals to generate a preliminary score for each first signal; 2) generating a quality score based on said preliminary score during a predetermined time frame or assigning a default quality score if a quality score is not generated during said predetermined time frame; and 3) transmitting said second signal via each of said transmission channels after either generating said quality score or assigning said default score and after said respective digital representations of all of said first signals are processed; and (e) a second programming module associated with said second processor for: 1) analyzing, using voice recognition technology, a respective digital representation of each of said first signals to generate a preliminary score for each first signal; 2) generating a quality score based on said preliminary score during a predetermined time frame or assigning a default quality score if a quality score is not generated during said predetermined time frame; and 3) transmitting said second signal via each of said transmission channels after either generating said quality score or assigning said default score and after said respective digital representations of all of said first signals are processed, wherein each of said first and second programming modules comprises:

a time stamp applying unit configured to apply a time stamp to said first signal, said time stamp being indicative of when said first signal was received by said apparatus, wherein a quality contour map is generated based in part on: i) the respective time stamps for a plurality of said first signals received over a period of time, and ii) the respective quality scores generated for said plurality of first signals, and wherein said plurality of first signals are received at a plurality of different locations at a plurality of different times within a region.

8. A system for evaluating more than one transmission channel simultaneously, comprising:

(a) a first processor;

(b) a second processor;

(c) a plurality of transmission channels therebetween; said first processor and second processor configured to interface with each of said plurality of transmission channels and to send a second signal to the other and receive a first signal from the other via each of said plurality of transmission channels, said first and second signals being sent as analog signals over said plurality of transmission channels;

(d) a first programming module associated with said first processor for: 1) analyzing, using voice recognition technology, a respective digital representation of each of said first signals to generate a preliminary score for each first signal; 2) generating a quality score based on said preliminary score during a predetermined time frame or assigning a default quality score if a quality score is not generated during said predetermined time frame; and 3) transmitting said second signal via each of said transmission channels after either generating said quality score or assigning said default score and after said respective digital representations of all of said first signals are processed; and (e) a second programming module associated with said second processor for: 1) analyzing, using voice recognition technology, a respective digital representation of each of said first signals to generate a preliminary score for each first signal; 2) generating a quality score based on said preliminary score during a predetermined time frame or assigning a default quality score if a quality score is not generated during said predetermined time frame; and 3) transmitting said second signal via each of said transmission channels after either generating said quality score or assigning said default score and after said respective digital representations of all of said first signals are processed, wherein the quality score is calculated based on the equation:

$$VQScore=SRConfidenceFactor*dM-dB,$$

wherein:
VQScore is the quality score,
SRConfidenceFactor is the preliminary score generated by the voice recognition technology,
dM is a multiplicative calibration factor, and
dB is an additive calibration factor.

9. A system for evaluating the quality of a transmission channel, comprising:

(a) a processor configured to interface to said transmission channel and to send a second signal and to receive a first signal via said transmission channel, said first signal corresponding to a digitized version of an analog signal that was sent from another apparatus to said apparatus over said transmission channel, said processor performing a digital-to-analog conversion of said first signal to obtain said first signal, said second signal being sent as an analog signal over said transmission channel;

(b) a communication device coupled to said transmission channel and configured to at least send said first signal to said processor via said transmission channel;

(c) a voice recognition module associated with said processor for analyzing, using voice recognition technology, said first signal to generate a preliminary score;

(d) a quality score module associated with said processor for generating a quality score based on said preliminary score during a predetermined time frame or assigning a default quality score if a quality score is not generated during said predetermined time frame; and (e) a time stamp applying unit configured to apply a time stamp to said first signal, said time stamp being indicative of when said first signal was received by said processor, wherein a quality contour map is generated based in part on: i) the respective time stamps for a plurality of said first signals received over a period of time, and ii) the respective quality scores generated for said plurality of first signals, and wherein said plurality of first signals are received at a plurality of different locations at a plurality of different times within a region.

10. A system for evaluating the quality of a transmission channel, comprising:

(a) a processor configured to interface to said transmission channel and to send a second signal and to receive a first signal via said transmission channel, said first signal corresponding to a digitized version of an analog signal that was sent from another apparatus to said apparatus over said transmission channel, said processor performing a digital-to-analog conversion of said first signal to obtain said first signal, said second signal being sent as an analog signal over said transmission channel;

(b) a communication device coupled to said transmission channel and configured to at least send said first signal to said processor via said transmission channel;

(c) a voice recognition module associated with said processor for analyzing, using voice recognition technology, said first signal to generate a preliminary score; and (d) a quality score module associated with said processor for generating a quality score based on said preliminary score during a predetermined time frame or assigning a default quality score if a quality score is not generated during said predetermined time frame, wherein the quality score is calculated by said quality score module based on the equation:

$$VQScore=SRConfidenceFactor*dM-dB,$$

wherein:
VQScore is the quality score,
SRConfidenceFactor is the preliminary score computed by said voice recognition module,
dM is a multiplicative calibration factor, and
dB is an additive calibration factor.

11. A system for evaluating more than one transmission channel simultaneously, comprising:

(a) a processor;

(b) a plurality of communication devices; and (c) a plurality of transmission channels therebetween; each of said plurality of communication devices configured to interface with one of said plurality of transmission channels and to send a first signal as an analog signal along said one of said plurality of transmission channels to said processor, said processor configured to interface with more than one of said plurality of transmission channels at any given time, to receive several first signals at once; said first signals being transmitted by each of said plurality of communication devices and to transmit an outgoing audio signal to each of said plurality of communication devices simultaneously;

(d) a voice recognition module associated with said processor for analyzing, using voice recognition technology, a respective digital representation of each of said first signals to generate a preliminary score for each first signal;

(e) a quality score module for generating a quality score based on said preliminary score during a predetermined time frame or assigning a default quality score if a quality score is not generated during said predetermined time frame; and (f) a time stamp applying unit configured to apply a time stamp to each of said first signals, said time stamp being indicative of when each of said first signals was received by said processor, wherein a quality contour map is generated based in part on: i) the respective time stamps for a plurality of said first signals received over a period of time, and ii) the respective quality scores generated for said plurality of first signals, and wherein said plurality of first signals are received at a plurality of different locations at a plurality of different times within a region.

12. A system for evaluating more than one transmission channel simultaneously, comprising:

(a) a processor;

(b) a plurality of communication devices; and (c) a plurality of transmission channels therebetween; each of said plurality of communication devices configured to interface with one of said plurality of transmission channels and to send a first signal as an analog signal along said one of said plurality of transmission channels to said processor, said processor configured to interface with more than one of said plurality of transmission channels at any given time, to receive several first signals at once; said first signals being transmitted by each of said plurality of communication devices and to transmit an outgoing audio signal to each of said plurality of communication devices simultaneously;

(d) a voice recognition module associated with said processor for analyzing, using voice recognition technology, a respective digital representation of each of said first signals to generate a preliminary score for each first signal; and (e) a quality score module for generating a quality score based on said preliminary score during a predetermined time frame or assigning a default quality score if a quality score is not generated during said predetermined time frame, wherein the quality score is calculated by said quality score module based on the equation:

$$VQScore = SRConfidenceFactor * dM - dB,$$

wherein:

VQScore is the quality score,

SRConfidenceFactor is the preliminary score computed by said voice recognition module, dM is a multiplicative calibration factor, and dB is an additive calibration factor.

* * * * *